Patented Sept. 2, 1941

UNITED STATES PATENT OFFICE 2,254,580

METHOD OF PACKAGING FRUIT IN HERMETICALLY SEALED CONTAINERS

William Perlman, Syracuse, N. Y., assignor to Continental Can Company, Inc., New York, N. Y., a corporation of New York No Drawing. Application May 6, 1939, Serial No. 272,269

1 Claim. (Cl. 99—186)

The invention relates to new and useful improvements in the method of packaging fruit such as apples, pears and the like in hermetically sealed containers.

An object of the invention is to provide a method of preparing the apples for the containers wherein the fruit is partially cooked and shrunken by removing the air and gases from the cells of the fruit.

A further object of the invention is to provide a method of packaging the shrunken fruit in containers wherein the fruit after it is sealed in the containers can absorb sufficient liquid so as to be restored to its normal size.

The method consists broadly in removing the skins from the fruit and then subjecting the fruit to contact with steam so that the fruit is partially cooked and wilted. Immediately after the steam treatment, the fruit is subjected to a vacuum for withdrawing the air and gases from the cells which results in a shrinking of the fruit. The fruit in its shrunken condition is packed in the container and the container supplied with a liquid only in sufficient quantity to be absorbed by the fruit after which the container is sealed and then processed in the usual way. The fruit will gradually absorb the liquid in the container and be restored to normal size.

It is thought that the invention will perhaps be better understood by a detail description of a method of carrying out the invention as applied to the packaging of apples. The apples are pared and preferably sliced and then placed in wire baskets. The filled baskets are placed in a handtruck and pushed into a horizontal retort. The door of the retort is closed and the vents are opened. Steam is introduced from below until all of the air is driven from the retort. The supply of steam is continued with the vents open until the apples are partially cooked and wilted. The vents are then closed. In the retort is a galvanized iron baffle which is placed over the truckload of apples. Cold water is sprayed on to the baffle which will condense the steam and create a vacuum in the retort. The baffle is so placed that the water does not contact with the apples. The steam partially cooks the apples as noted, and also assists in the expulsion of the air and gases from the cells of the apples when the vacuum is created. The vacuum may be increased by mechanical means of any suitable character.

At this point in the method, the apples are in a shrunken, flabby, hot condition. The vacuum is now relieved and the apples are ready to be packed in cans. If a No. 10 can is used, then approximately six pounds of the wilted fruit is placed in the can and about one pint of liquid, water or syrup. The cans are then closed and processed in boiling water, and the water cooled, which is a standard practice. The canned fruit slowly absorbs the liquid which has been placed in the can and resumes its normal size. The result obtained when the can is opened is a solid block of fruit of superior flavor and color. It has a translucent appearance, and the interior, a non-fibrous texture of applesauce, although it retains the form of the original slices.

When the fruit is packed in the cans in a shrunken condition, more pounds of fruit can be placed therein for a given size can than can be accomplished by any process or method heretofore used for the packaging of fruit in hermetically sealed containers.

It is obvious that the method of applying steam to the apples can be varied. It is essential, however, that the steam shall be brought into contact with the fruit so as to partially cook and wilt the same, and thereby assist in the removing of the air and gases from the cells of the fruit when a vacuum is created about the fruit. It is also obvious that many ways may be devised for providing a vacuum which will draw the air and gases out of the cells. Here again, it is essential that the fruit shall be subjected to the vacuum pull immediately after the steam treatment and while the fruit is hot. While it is preferred to remove the fruit from the retort and immediately pack the same in its shrunken condition in containers in which the fruit is to be marketed, the time of pack and the conditions under which it is packed, are not so important, although it is preferred to pack the fruit immediately after it is shrunken, and before any discoloration takes place through contact with the air.

While the invention described is applied to apples and pears, it may be applied to other fruits.

Having thus described the invention, what I claim as new and desire to secure by Letters Patent, is:

The method of packaging fruit in sealed containers for the market consisting in removing the skins from the fruit, first placing the fruit in a closed retort, subjecting the retort to steam so that the steam contacts with the fruit and partially cooks and wilts the same, creating a vacuum on said retort while protecting the fruit from contact by water of condensation while drawing the air and gases from the cells of the fruit for shrinking the same, relieving the vacuum and removing the shrunken fruit from the retort, then packing the shrunken fruit in a container in which it is to be marketed, supplying the container with a syrup in sufficient quantity to be absorbed by the fruit, sealing the container and processing the same whereby the fruit is caused to absorb the syrup and be restored to a substantially normal condition.

WILLIAM PERLMAN.